United States Patent [19]

Yoshimura et al.

[11] Patent Number: 5,142,106
[45] Date of Patent: Aug. 25, 1992

[54] COORDINATES INPUT APPARATUS

[75] Inventors: Yuichiro Yoshimura, Yokohama; Shinnosuke Taniishi, Kawasaki; Katsuyuki Kobayashi, Tokyo; Ryozo Yanagisawa, Matsudo; Kiyoshi Kaneko; Takeshi Kamono, both of Yokohama; Atsushi Tanaka, Kawasaki, all of Japan

[73] Assignee: Canon Kabushiki Kaisha, Tokyo, Japan

[21] Appl. No.: 730,444

[22] Filed: Jul. 16, 1991

[30] Foreign Application Priority Data

Jul. 17, 1990 [JP] Japan ................... 2-189244

[51] Int. Cl.⁵ .............................. G08C 21/00
[52] U.S. Cl. ........................ 178/18; 367/907
[58] Field of Search .............. 178/18, 19; 367/907

[56] References Cited

U.S. PATENT DOCUMENTS 4,980,518 12/1990 Kobayashi et al. .................. 178/18

Primary Examiner—Stafford D. Schreyer
Attorney, Agent, or Firm—Fitzpatrick, Cella, Harper & Scinto

[57] ABSTRACT

In a coordinates input apparatus in which a vibration input from a vibration pen is detected by a plurality of vibration sensors attached to a transparent vibration propagating plate such as an acrylic or glass plate and the coordinate position of the vibration pen is detected from the vibration propagation times until the vibration sensors, the sensors and the vibration proof material are arranged in a manner such that a distance between the attaching boundary surface of the vibration proof material attached to the peripheral portion of the vibration propagating plate and the center of each sensor which is attached to the input side than the attaching boundary surface of the vibration proof material lies within a range from 0.5 time to a value less than 1.0 time as large as the diameter of the sensor, preferably, within a range from 1.0 mm to a value less than 2.0 mm.

2 Claims, 8 Drawing Sheets

COORDINATES INPUT APPARATUS

BACKGROUND OF THE INVENTION

1. Field of the Invention

The present invention relates to a coordinates input apparatus and, more particularly, to a coordinates input apparatus which detects coordinates of an indication point from a vibration propagation time on a vibration propagating plate and has a structure in which vibration proof materials are arranged in edge portions of the vibration propagating plate.

2. Related Background Art

Hitherto, there has been known a coordinates input apparatus in which a vibration is input to a vibration propagating plate by a vibration pen having therein a piezoelectric transducing element or the like, the input vibration is detected by a plurality of sensors attached to the vibration propagating plate, the vibration propagation times are measured, and the coordinates of the input point are detected.

In such a coordinates input apparatus, there is a construction in which the edge portions of the vibration propagating plate are supported by vibration proof materials so as to prevent a situation such that the input vibration is reflected by the edge portions of the vibration propagating plate and an error is caused in the detection by the vibration sensor due to the reflected waves.

The conventional vibration proof material has mainly been developed to prevent noises and is largely classified as a material for use as a countermeasure for the air sound and a material for use as a countermeasure for the solid sound. Therefore, in the case of using the conventional vibration proof material in the above application fields, the material as a countermeasure for the solid sound is used. As a conventional damping material as a countermeasure for the solid sound, a damping sheet for a thin plate as shown in FIG. 8A, a paint, or the like has been known.

In FIG. 8A, reference numeral 8' denotes a vibrating plate whose vibration should be damped and 7 indicates a damping sheet. The vibrating plate 8' is made of a metal plate such as thin steel plate, aluminum plate, or the like, a resin plate, a glass plate, or the like.

In such a structure, by adhering the damping sheet 7 onto the vibrating plate 8' which is vibrating, the vibration of the plate 8' is decreased by using a vibration attenuation of the damping sheet 7, so that the noises can be reduced.

As materials for commercially available damping sheets 7, there are a polyvinyl chloride resin, atactic polypropylene, polyethylene vinyl acetylate, a styrene-butadiene rubber, a silicon rubber, a cement paste, and the like. Further, the products which are obtained by adding or mixing a plasticizer, a stabilizer, a softener, metal powder of lead, iron, or the like, quarts sand, asphalt, and the like to the above materials are used. As a molding shape of those materials, there is a sponge-like porous shape.

The conventional damping sheets as mentioned above are considered to suppress the vibration of the whole plate mainly by adhering the damping sheet onto the whole plate which vibrates.

Therefore, even if the conventional damping sheet is attached to the periphery of the vibration propagating plate 8 as shown in FIG. 8B in order to suppress the reflected waves at the edge portions of the vibration propagating plate, the reflected waves cannot be sufficiently reduced.

FIG. 8B is a diagram showing the vibration propagation in the case where the damping sheet has been attached to the peripheral portion of the vibration propagating plate. FIG. 8C is a diagram of a part of a cross sectional view of FIG. 8B and shows a state of the reflected waves.

In the diagrams, reference numeral 8 denotes a vibration propagating plate; 7 the damping sheet; 3 a vibration pen as a source to apply a vibration; a wave showing a vibration which is propagated from a vibration applied point as a contact point between the vibration pen 3 and the vibration propagating plate 8; B a reflected wave at the edge surface of the vibration propagating plate; and C a reflected wave at the boundary surface in the portion where the damping sheet has been attached.

The damping effect of the conventional damping sheet 7 is large for the vibration (also including a natural vibration, i.e., resonant vibration) which occurs in the whole plate as mentioned above. However, as shown in FIG. 8B, an adequate damping effect is not derived for a vibration which has been applied to a region where no damping sheet is attached and which propagates as a progressing wave from such a region. Therefore, as shown in FIG. 8C, although the vibration is slightly attenuated in a portion D to which the damping sheet 7 has been attached, the reflected wave B at the edge surface of the vibration propagating plate cannot be sufficiently suppressed.

Further, by attaching the conventional damping sheet 7, the reflected wave C is newly generated at the interface surface where the damping sheet has been attached. Consequently, if the conventional damping sheet has merely been attached to the peripheral portion of the vibration propagating plate of the coordinates input apparatus using an elastic wave, the foregoing two reflected waves are generated and become noises when a direct wave from the vibration applying source is detected, so that a detecting precision is deteriorated.

When considering the conventional example of the vibration proof material (damping sheet) attached to the vibration propagating plate mentioned above, it is necessary to pay an attention to the following two points with respect to the positional relation between the vibration sensor (hereinafter, simply referred to as a sensor) and the vibration proof material which is attached to the peripheral portion of the vibration propagating plate in the coordinates input apparatus in which a vibration which has been input from the vibration pen is detected by a plurality of vibration sensors attached to the vibration propagating plate and the position of the vibration pen is detected from the vibration propagation times until the vibration sensors. One point relates to an influence which is exerted on the vibration propagation by the attenuation of the vibration proof material. Another point relates to an influence by the reflected wave which is generated by the surface on which the vibration proof material has been attached. The same applicant as the present invention has hitherto proposed the following apparatuses with regard to the above two points. In the "Coordinates input apparatus" disclosed in Japanese Patent Application No. 62-67856, by attaching sensors a predetermined distance away from a vibration proof material (two wavelengths) or longer, the influence exerted on the vibration propagation by the attenuation of the vibration proof material is reduced. In the "Coordinates input apparatus" disclosed in Japanese Patent Application No. 61-251598, by attaching sensors so as to be away from a vibration proof material by a predetermined distance (reflection interference distance) or longer, the influence by the reflected wave which is generated by the vibration proof material attaching surface is reduced. Further, in the "Coordinates input apparatus" disclosed in Japanese Patent Application No. 61-251599, by attaching sensors onto the vibration proof material attaching boundary surface, the influence of the reflected wave which is generated by the vibration proof material attaching surface is reduced.

In the above conventional apparatuses, however, there are drawbacks such that in the case of attaching the sensors so as to be away from the vibration proof material by a predetermined distance or longer, outer dimensions of the whole apparatus are too large, while in the case of attaching the sensors onto the vibration proof material attaching boundary surface, the vibration proof material and the sensors cannot be attached onto the same surface of the vibration propagating plate and the thickness of apparatus increases and the like.

SUMMARY OF THE INVENTION

It is an object of the invention to provide a coordinates input apparatus in which a vibration which has been input from a vibration pen is detected by a plurality of vibration sensors attached to a vibration propagating plate and the position of the vibration pen is detected from vibration propagation times until the vibration sensors, wherein the sensors are attached so as to be away from the vibration proof material to the pen input side in a manner such that a distance between the attaching boundary surface of the vibration proof material which is attached to the peripheral portion of the vibration propagating plate and the center of the vibration sensor lies within a range from a value of 0.5 time to a value less than 1.0 time as large as a diameter of the sensor, thereby making it possible to reduce an influence which is exerted on the vibration propagation by the attenuation of the vibration proof material.

Another object of the invention is to enable the influence of reflected wave generated from the vibration proof material attaching surface to be reduced in the above coordinates input apparatus, thereby enabling a detecting precision to be improved.

Still another object of the invention is to enable an outer shape of the whole coordinates input apparatus to be fixed.

DETAILED DESCRIPTION OF THE PREFERRED EMBODIMENTS

An embodiment according to the invention will be described in detail hereinbelow with reference to the drawings.

Description of construction of apparatus (FIG. 1)

Figure 1A:
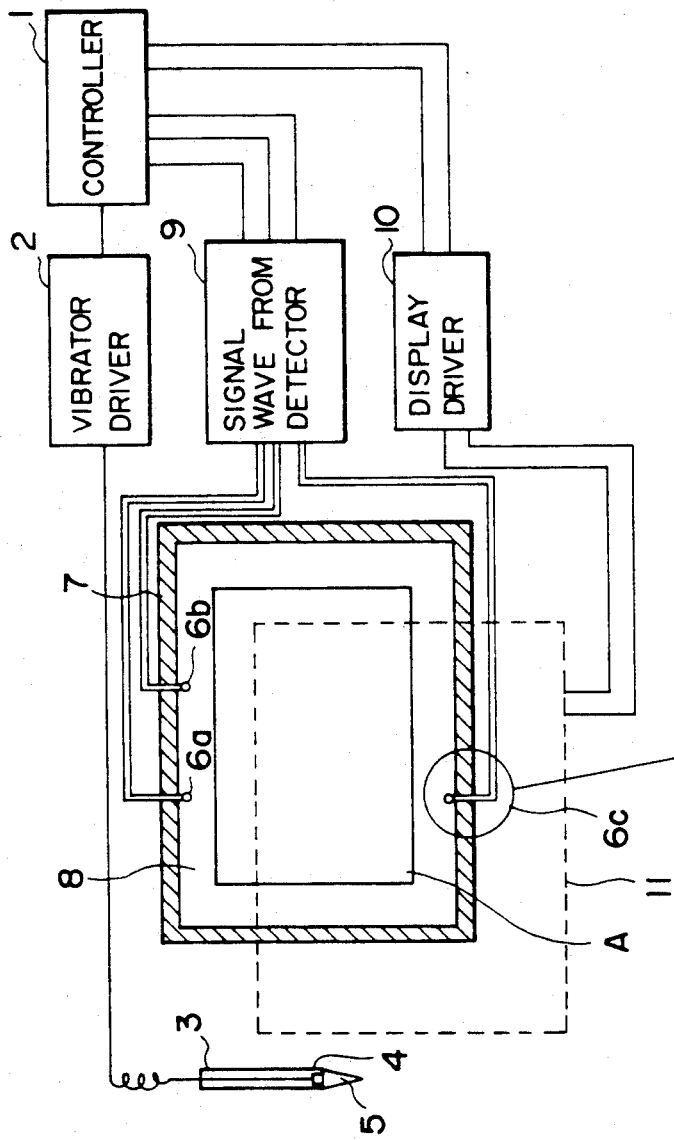
FIG. 1A is a block constructional diagram of a coordinates input apparatus according to an embodiment.

FIG. 1A shows a structure of a coordinates input apparatus according to the embodiment.

In the diagram, reference numeral 1 denotes a controller to control the whole apparatus and to calculate a coordinate position; 2 indicates a vibrator driver to vibrate a pen tip in the vibration pen 3; and 8 the vibration propagating plate made of a transparent material such as acrylic plate, glass plate, or the like. By allowing the vibration pen 3 to touch the surface of the vibration propagating plate 8, coordinates of the vibration point are input. Actually, the inside of an area (hereinafter, referred to as an effective area) A surrounded by a solid line in FIG. 1A is designated by the vibration pen 3, thereby inputting the coordinates. The vibration proof material 7 is attached to the outer periphery of the plate 8, thereby preventing (decreasing) the reflected vibration from returning to the central portion. Vibration sensors 6a to 6c such as piezoelectric transducing elements or the like each for converting a mechanical vibration into an electric signal are fixed to the positions shown in the diagram of the boundary portions between the periphery of the plate 8 and the vibration proof material 7.

Figure 1B:
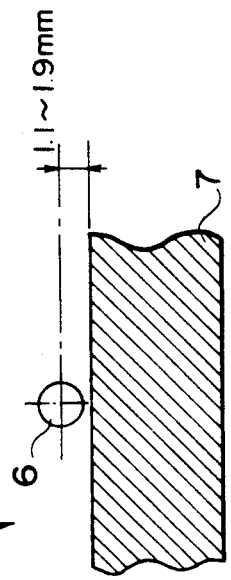
FIG. 1B, is a constructional diagram of a vibration proof material in the embodiment.

The sensors and the vibration proof material are constructed in a manner such that a distance between the attaching boundary surface of the vibration proof material which is attached to the peripheral portion of the vibration propagating plate and the center of each vibration sensor which is attached on the input side than the attaching boundary surface of the vibration proof material lies within a range from a value which is 0.5 time to a value which is less than 1.0 time as large as a diameter of the sensor. Although the shapes and material of each of the vibration sensors which are used in the invention are not limited so long as means for detecting a vibration is used as such a sensor. In the embodiment, however, a cylindrical piezoelectric transducing element having a diameter of 2.0 mm is used. Therefore, the distance between the center of the sensor and the attaching boundary surface of the vibration proof material which is attached to the peripheral portion of the vibration propagating plate is set to a value within a range from 1.0 mm to a value less than 2.0 mm as shown in FIG. 1B. Detailed explanation will be made hereinlater.

Reference numeral 9 indicates a signal waveform detector for supplying a signal indicating that the vibration has been detected by each of the vibration sensors 6a to 6c to the controller 1. Reference numeral 11 denotes a display such as a CRT (or liquid crystal display) which can display on a dot unit basis. The display 11 is arranged behind the plate 8. The display 11 displays dots at the position traced by the vibration pen 3 due to the driving of a display driver 10. The displayed dot image can be seen through the vibration propagating plate 8 (because it is made of a transparent material). That is, the dots are displayed at the position on the display 11 corresponding to the coordinates of the vibration pen 3 detected. An image which is constructed by elements such as points, line, and the like which has been input by the vibration pen 3 appears after the locus of the vibration pen as if it were written onto a paper.

According to the above structure, it is also possible to use an input method such that a menu is displayed on the display 11 and a desired item in the menu is selected by the vibration pen 3, or a prompt is displayed and the vibration pen 3 is come into contact with a predetermined position, or the like.

Figure 2:
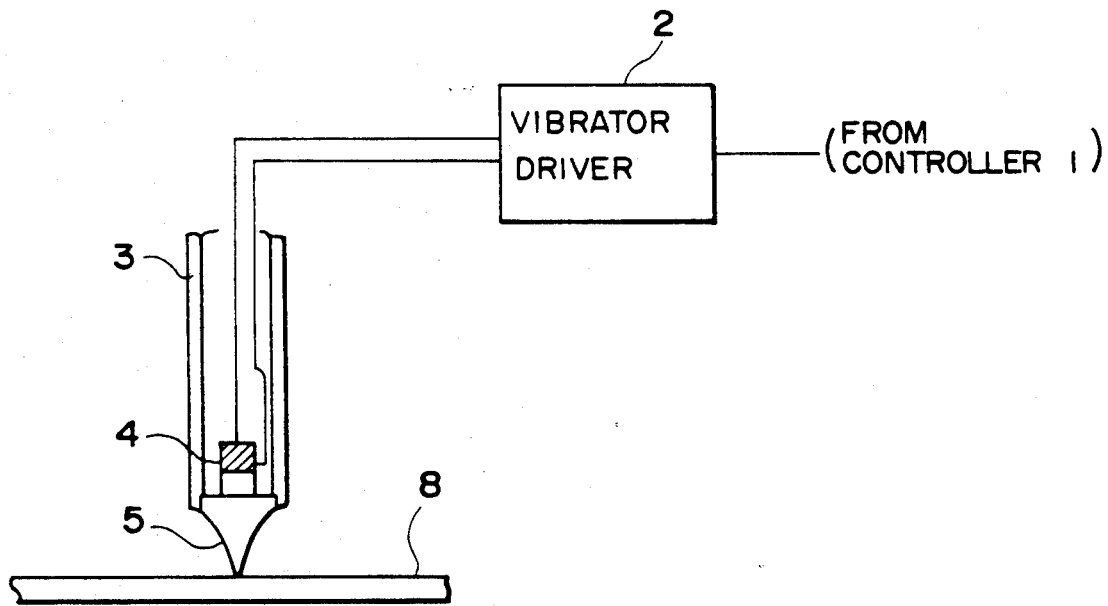
FIG. 2 is a diagram showing a structure of a vibration pen.

FIG. 2 shows a structure (cross sectional view) of the vibration pen 3 in the embodiment.

A vibrator 4 provided in the vibration pen 3 is driven by the vibrator driver 2. A driving signal of the vibrator 4 is supplied from the controller 1 as a low-level pulse signal and is amplified at a predetermined gain by the vibrator driver 2 which can be driven by a low impedance. After that, the amplified signal is supplied to the vibrator 4.

The electric driving signal is converted into the mechanical ultrasonic vibration by the vibrator 4 and is propagated to the vibration propagating plate 8 through a horn portion (pen tip) 5.

An oscillating frequency of the vibrator 4 is selected as a value such that a plate wave can be generated in the vibration propagating plate 8 such as acrylic plate, glass plate, or the like. A vibrating mode is selected to a mode such that upon driving of the vibrator, the vibrator 4 mainly vibrates in the vertical direction in FIG. 2, that is, the direction perpendicular tot he vibration propagating plate 8. An efficient vibration conversion can be performed by setting the oscillating frequency of the vibrator 4 to a resonant frequency of the vibrator 4.

The elastic wave which is propagated to the vibration propagating plate 8 as mentioned above is the plate wave and has an advantage such that it is hardly influenced by scratches, an obstacle, or the like on the surface of the vibration propagating plate as compared with a surface wave or the like.

The principle regarding the determination of the dimensions of the vibration propagating plate 8, the attaching position of the reflection preventing material 7, arranging positions of the vibration sensors 6a to 6c, and the like in the embodiment with the above structure will be explained in detail hereinlater.

Figure 3:
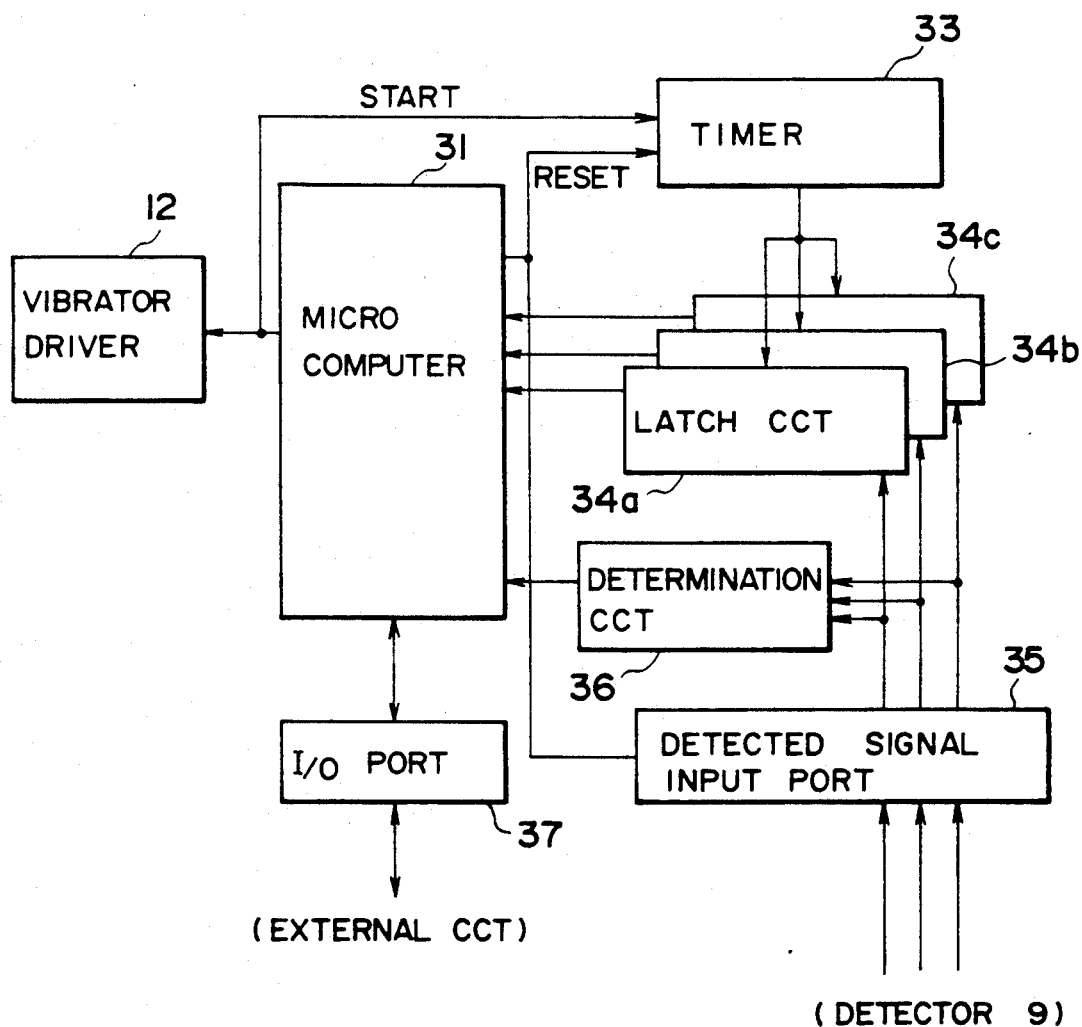
FIG. 3 is a diagram showing an internal construction of a controller in the embodiment.

Description of controller (FIG. 3)

In the above construction, the controller 1 generates a signal to drive the vibrator 4 in the vibration pen 3 to the vibrator driver 2 every predetermined period (for instance, every 5 msec) and also allows an internal timer (which is constructed by a counter) to start the time counting operation. The vibration generated by the vibration pen 3 is delayed by times corresponding to the distances until the vibration sensors 6a to 6c and arrives. A signal waveform detector 9 detects output signals from the vibration sensors 6a to 6c and produces signals indicative of the vibration arrival timings to the vibration sensors by a waveform detecting process, which will be explained hereinlater. The controller 1 receives the above timing signal for each sensor and detects the vibration arrival times until the vibration sensors 6a to 6c, thereby calculating the coordinate position of the vibration pen.

On the basis of the coordinate position information of the vibration pen 3 which has been calculated, the controller 1 drives the display driver 10 and controls the display operation by the display 11.

FIG. 3 shows an internal construction of the controller 1 in the embodiment. Component elements of the controller 1 and an outline of the operation will now be described hereinbelow.

In the diagram, reference numeral 31 denotes a microcomputer to control the controller 1 and the whole coordinates input apparatus. The microcomputer 31 has therein an internal counter, an ROM in which an operation procedure has been stored, an RAM which is used as a work area, and the like. Reference numeral 33 denotes a timer (constructed by a counter) to count reference clocks (not shown). A start signal to start the driving of the vibrator 4 in the vibration pen 3 is supplied to the vibrator driver 2, thereby starting the time counting operation of the timer 33. That is, the start timing to count and the timing to generate the vibration are synchronized by such a start signal.

The other circuits as component elements will now be sequentially explained.

The timing signals of the vibration arrivals of the vibration sensors 6a to 6c derived through the signal waveform detector 9 are supplied to latch circuits 34a to 34c through a detected signal input port 35. The latch circuits 34a to 34c correspond to the vibration sensors 6a to 6c. When each latch circuit receives the timing signal as a signal of the corresponding vibration sensor, the latch circuit latches a count value of a timer 33 at such a time point. If a determination circuit 36 decides that all of the detected signals have been received, it generates a signal indicative of the completion of the reception of all of the detected signals to the microcomputer 31. When the microcomputer 31 receives such a decision signal from the determination circuit 36, the microcomputer 31 reads the vibration arrival times until the vibration sensors from the latch circuits 34a to 34c and calculates the coordinate position on the vibration propagating plate 8 by the vibration pen 3 by executing predetermined calculations. The calculated coordinate position information is supplied to the display driver 10 through an I/O port 37, thereby displaying, for instance, dots or the like to the corresponding position on the display.

Figure 4:
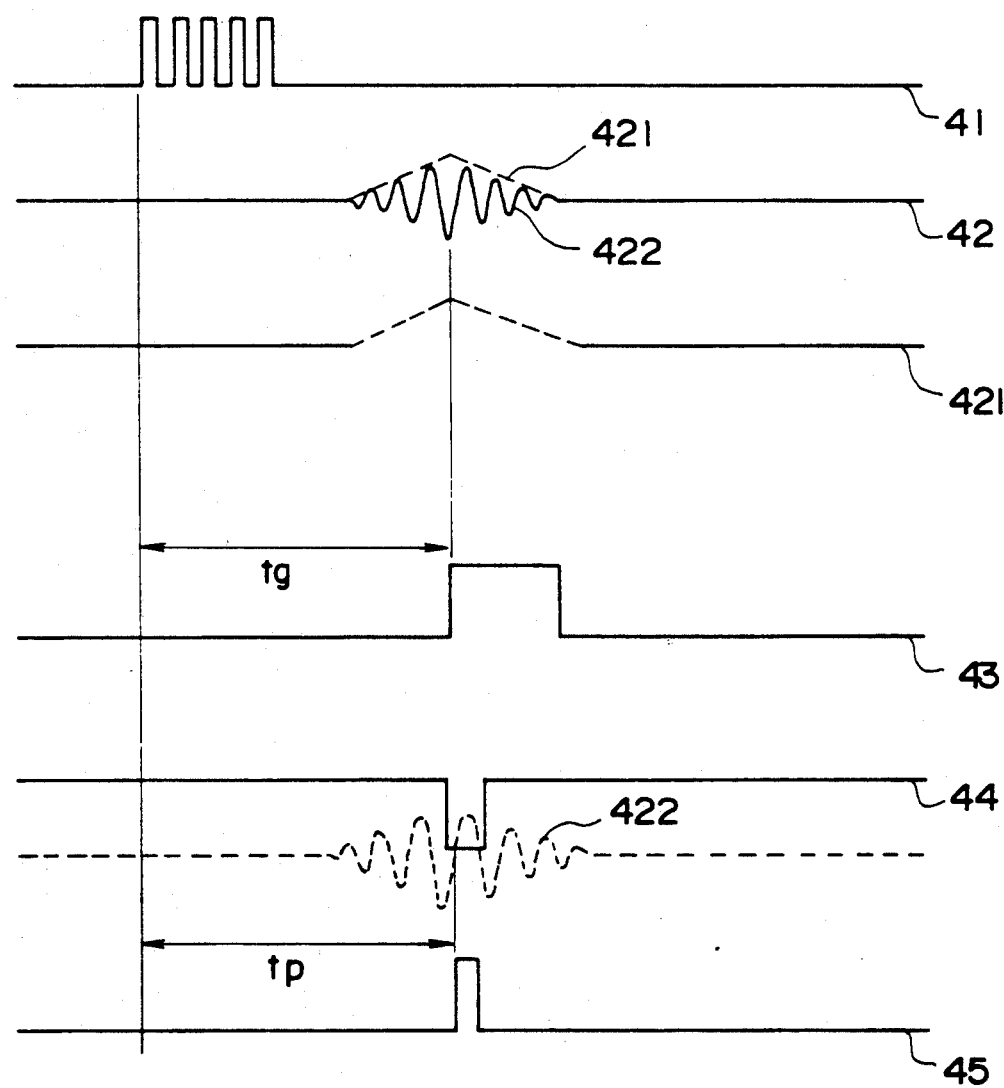
FIG. 4 is a diagram for explaining the measurement of distances between a vibration pen and vibration sensors.
Figure 5:
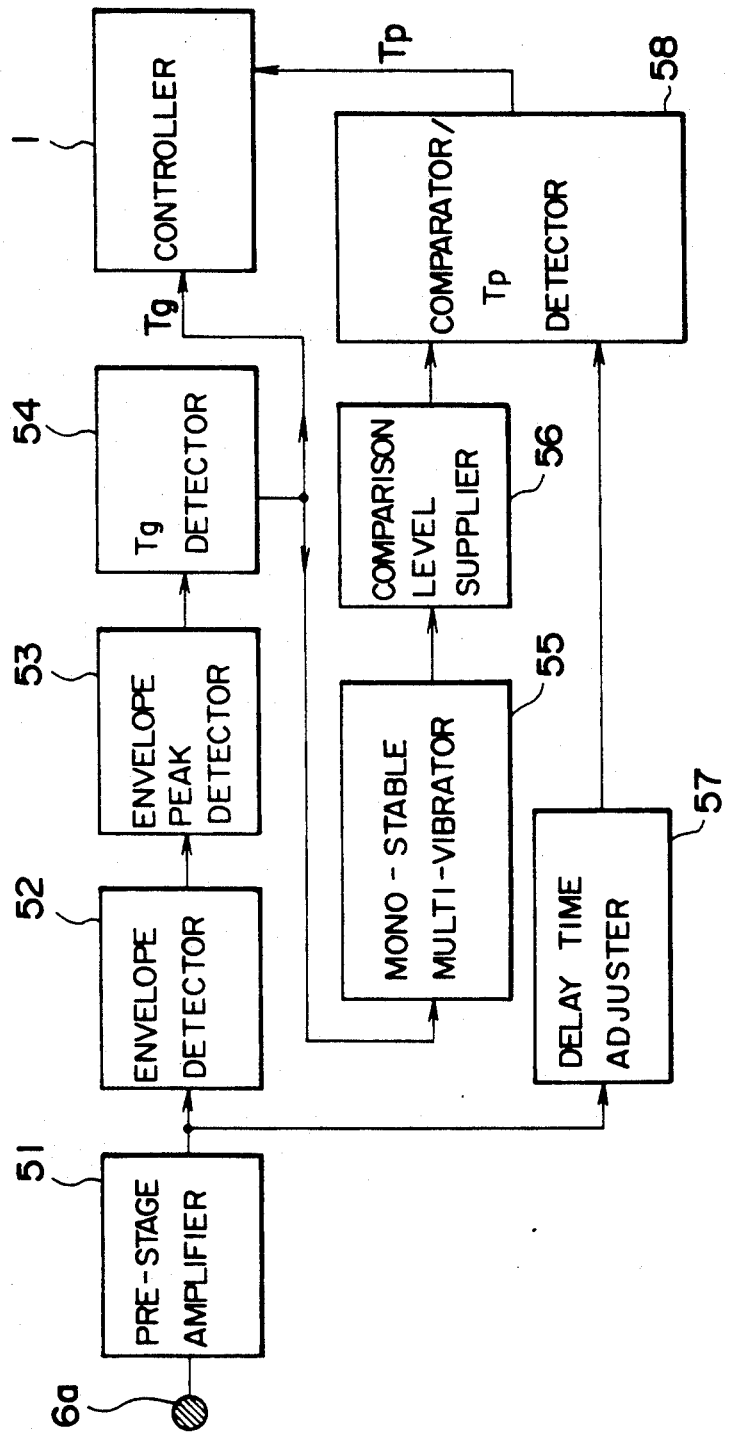
FIG. 5 is a diagram showing contents of a construction of a part of a signal waveform detector in the embodiment.

Description of vibration propagation time detection (FIGS. 4 and 5)

The principle to measure the vibration arrival times until the vibration sensors will not be described hereinbelow.

FIG. 4 is a diagram for explaining detection waveforms which are supplied to the signal waveform detector 9 and measuring processes of the vibration propagation times based on the detection waveforms. Although explanation will be made hereinbelow with respect to the case of using the vibration sensor 6a, the same shall also apply to the other vibration sensors 6b to 6c.

It has already been described above with respect to a point that the measurement of the vibration propagation time to the vibration sensor 6a is started by the generation of the start signal to the vibrator driver 2.

A this time, a signal 41 has already been applied from the vibrator driver 2 to the vibrator 4.

The ultrasonic vibration which has been propagated from the vibration pen 3 to the vibration propagating plate 8 by the signal 41 progresses in the plate 8 for a time $t_g$ corresponding to the distance until the vibration sensor 6a. After that, the vibration is detected by the sensor 6a. Reference number 42 denotes a signal waveform detected by the vibration sensor 6a.

The plate wave is used as a vibration wave in the embodiment. Therefore, the relation between an envelope 421 and a phase 422 of the detected waveform changes in accordance with the propagation distance in the vibration propagating plate 8 during the vibration propagation.

It is now assumed that a progressing velocity of the envelope 421, that is, a group velocity is set to $V_g$ and a phase velocity of the phase 422 is set to $V_p$. The distance between the vibration pen 3 and the vibration sensor 6a can be detected from a difference between the group velocity $V_g$ and the phase velocity $V_p$.

An attention is first paid to only the envelope 421. The velocity of the envelope 421 is equal to $V_g$ and if a certain special point on the waveform, for instance, a peak is detected as shown by a signal 43 in the diagram, a distance d between the vibration pen 3 and the vibration sensor 6a is obtained as follows when assuming that the vibration propagation time is set to $t_g$.

$$d = V_g \cdot t_g \qquad \ldots \text{①}$$

The above equation relates to the vibration sensor 6a and the distances between the other two vibration sensors 6b to 6c and the vibration pen 3 are also expressed by the same equation based on the similar principle.

Further, to determine the higher precise coordinate values, a process based on the detection of the phase signal is executed.

Assuming that a time which is required to a special detection point of the phase waveform signal 422, for instance, to a zero-cross point after passage of the peak from the input of the vibration is set to a $t_p$ (which is obtained by producing a window signal 44 having a predetermined width by the signal 43 and by comparing with the phase signal 422), the distance d between the vibration sensor and the vibration pen is expressed as follows.

$$d = n \cdot \lambda_p + V_p \cdot t_p \qquad \ldots \text{②}$$

where, $\lambda_p$ is a wavelength of the elastic and n is an integer.

The integer n is expressed as follows from the equations ① and ②.

$$n = [(V_g \cdot t_g - V_p \cdot t_p)/ \lambda_p + 1/N] \qquad \ldots \text{③}$$

where, N is a real number other than 0 and a proper numerical value is used. For instance, if N=2, n can be determined within ±½ of the wavelength. By substituting the value n obtained into the equation ②, the distance between the vibration pen 3 and the vibration sensor 6a and the distances between the vibration pen 3 and the vibration sensors 6b and 6c can be accurately measured.

Signals 43 and 45 to measure the two vibration propagation times $t_g$ and $t_p$ mentioned above are detected by the signal waveform detector 9. The signal waveform detector 9 is constructed as shown in FIG. 5.

In FIG. 5, an output signal of the vibration sensor 6a is amplified to a predetermined level by a pre-stage amplifier 51. The amplified signal is supplied to an envelope detector 52, by which only an envelope of the detection signal is extracted. A timing of the peak of the extracted envelope is detected by an envelope peak detector 53. The peak detection signal is supplied to a $T_g$ detector 54 comprising a monostable multivibrator or the like, by which a signal $T_g$ (signal 43) as an envelope delay time detection signal having a predetermined waveform is formed and is supplied to the controller 1.

The signal $T_g$ passes through a monostable multivibrator 55 (which generates the signal 44) and a comparison level supplier 56 and is supplied to a comparator/$T_p$ detector 58 in order to compare with the original signal delayed by a delay time adjuster 57. A phase delay time signal $T_p$ is supplied from the comparator/$T_p$ detector 58 to the controller 1.

The above-described circuit relates to the vibration sensor 6a and the same circuits are also provided for the other vibration sensors 6b and 6c.

Assuming that the number of sensors is set to a general number of h, h detection signals of the envelope delay times $t_{gl}$ to $T_{gh}$ and h detection signals of the phase delay times $T_{pl}$ to $T_{ph}$ are supplied to the controller 1, respectively.

In the controller 1, the above signals $T_{gl}$ to $T_{gh}$ and $T_{pl}$ to $T_{ph}$ are received from the input port 35 and a count value of the timer 33 is fetched into the latch circuits 34a to 34c by using the respective timings as triggers. Since the operation of the timer 33 is started synchronously with the driving of the vibration pen, the data indicative of the delay times of the envelopes and phases of the vibration sensors 6a to 6c are latched into the latch circuits 34a to 34c, respectively.

Figure 6:
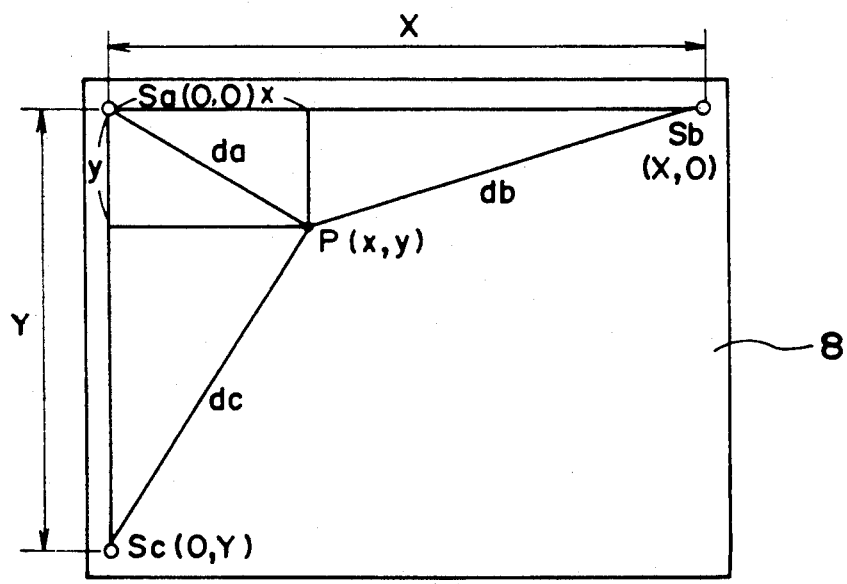
FIG. 6 is a diagram for explaining the principle of the calculation of a coordinates position.

Description of calculation of coordinate position (FIG. 6)

The principle of the detection of the coordinates position on the vibration propagating plate 8 by the vibration pen 3 will now practically be explained.

It is assumed that coordinates of the vibration sensor 6a on the vibration propagating plate 8 are set to $S_a(0, 0)$, that is, an origin and that coordinate positions of the vibration sensors 6b and 6c are set to $S_b(X, 0)$ and $S_c(0, Y)$ and that coordinates of the vibration pen are set to $P(x, y)$.

Assuming that the distances between the vibration pen 3 and the vibration sensors 6a to 6c are set to $d_a$ to $d_c$ on the basis of the foregoing principle, the coordinates $P(x, y)$ are obtained as follows by the theorem of three squares.

$$x = \frac{X}{2} + \frac{(d_a + d_b) \cdot (d_a - d_b)}{2X}$$

$$y = \frac{Y}{2} + \frac{(d_a + d_c) \cdot (d_a - d_c)}{2X}$$

where, "X" and "Y" denote distances in the lateral and vertical directions between the vibration sensor 6a and the vibration sensors 6b and 6c.

As mentioned above, the coordinates of the position of the vibration pen 3 can be detected in a real-time manner.

Description of construction of vibration proof material and sensors of the invention As mentioned in the conventional apparatuses, in order to reduce the influence by the attenuation by the vibration proof material, the sensors need to be away from the vibration proof material on the pen input side as far as possible. On the other hand, to reduce the influence by the reflected waves by the attaching boundary surface of the vibration proof material, on the contrary, the centers of the sensors must be close to the attaching boundary surfaces of the vibration proof material as possible. (Contrarily, to reduce the influence by the reflected waves by arranging the sensors so as to be away from the vibration proof material, the sensors must be extremely far away from the vibration proof material, so that the outer size of the entire apparatus remarkably increases.) In the invention, from the results of the experiments, the optimum value of the distance between the center of the sensor and the attaching boundary surface of the vibration proof material is obtained and the sensor and the vibration proof material are arranged within such a distance range. Table 1 shows constants and fluctuation values of the calculation values of the distances d between the pen and the sensors in the case where the distance (hereinafter, referred to as an S-B distance) between the center of each sensor and the attaching boundary surface of the vibration proof material has been varied within a range from 1.1 to 1.7 mm and the case where the S-B distance has been varied within a range from 1.1 to 2.0 mm.

TABLE 1

Influences which are exerted on constants and accuracies by the distance (S-B distance) between the center of the sensor and the attaching boundary surface of the vibration proof material (angle between the vibration proof material and the pen scanning direction is set to 18°)

Figure 7A:
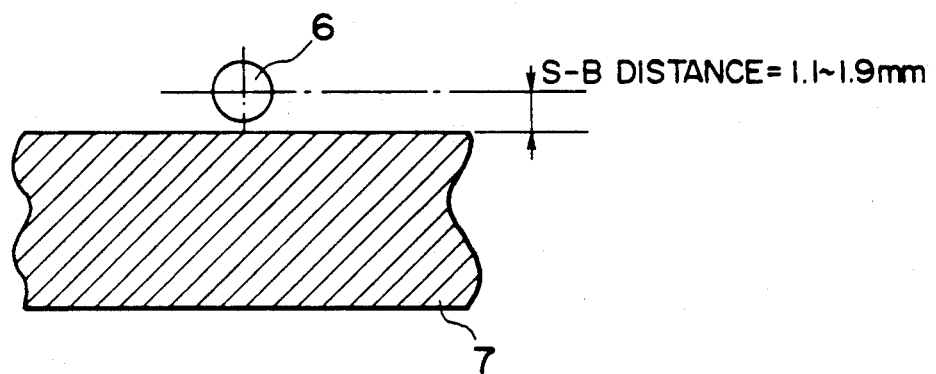
FIG. 7A is an explanatory diagram of a positional relation between the center of a sensor and an attaching boundary surface of a vibration proof material according to the invention.
Figure 7B:
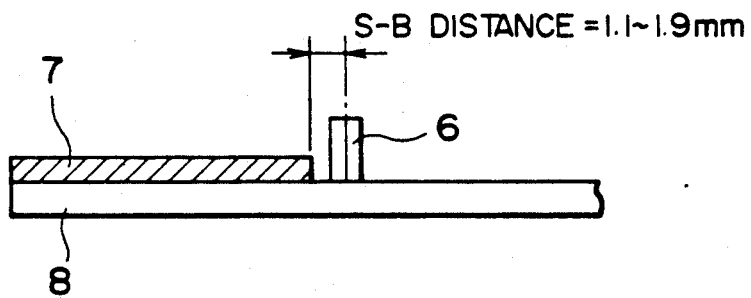
FIG. 7B is a cross sectional view of FIG. 7A.
Figure 8A:
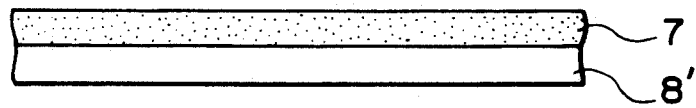
FIGS. 8A to 8C, are explanatory diagrams of a conventional example.
Figure 8B:
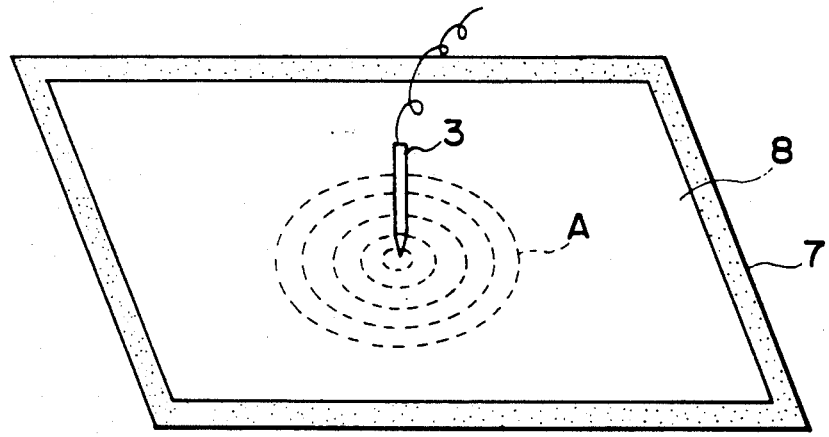
Figure 8C:
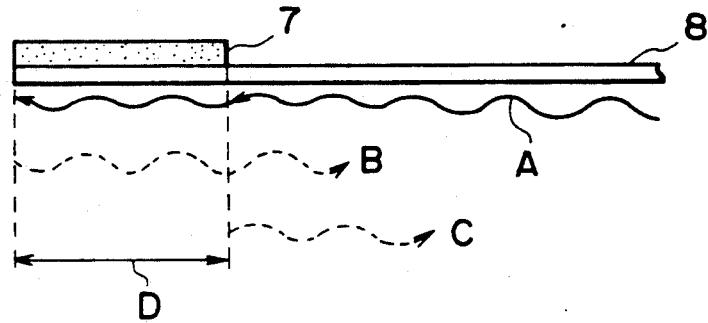

| S-B distance (mm) fluctuation width | $V_p$ (m/sec) fluctuation value | f (kHz) fluctuation value | Distance d (mm) fluctuation value |
|---|---|---|---|
| 1.1–1.7 | 0.32 | 0.16 | 0.05 |
| 1.1–2.0 | 0.92 | 0.22 | 0.10 | d Calculation value of the distance between the sensor and the pen which has been mentioned in the description of the detection of the vibration propagation time The constant $V_g$ and the value of n are omitted because they are not influenced by the S-B distance fluctuation range. In the embodiment, a glass plate having a thickness of about 1.1 mm has been used as a propagating plate and a driving frequency has been set to about 260 kHz. An angle between the vibration proof material and the pen scanning direction has been set to a low angle (18°) at which the influence by the S-B distance fluctuation largely appears. As will be understood from Table 1, when the S-B distance fluctuation range is equal to 1.1 to 1.7 mm, the constants and d hardly fluctuate. However, when the S-B distance fluctuation range is widened to 1.1 to 2.0 mm, the fluctuations of the constants and d suddenly increase and an adverse influence is exerted on the coordinate detecting accuracy. This is because as the S-B distance increases, the vibration wave is influenced by the interferences of the reflected waves from the vibration proof material boundary surface. On the contrary, if the S-B distance is set to a value smaller than 1.0 mm, the sensor comes into contact with the vibration proof material (in the case where they are attached to the same side of the propagating plate), and it is inconvenient. According to the invention, therefore, as shown in FIGS. 7A and 7B, the distance between the attaching boundary surface of the vibration proof material which is attached to the peripheral portion of the vibration propagating plate and the center of the vibration sensor which is attached to the input side than the attaching boundary surface of the vibration proof material is set to a value within a range from 1.0 mm to a value less than 2.0 mm. Thus, the coordinate position can be detected at a high precision.

In the construction of the invention, the plate thickness and the driving frequency can be also set to values other than those in the conditions regarding the propagating plate and the driving frequency in the above Description of construction of vibration proof material and sensors in the invention.

As will be obviously understood from the above description, according to the invention, in the coordinates input apparatus in which a vibration which has been input from the vibration pen is detected by a plurality of vibration sensors attached to the vibration propagating plate and the vibration pen position is detected from the vibration propagation times until the vibration sensors, the sensors are attached so as to be away from the vibration proof material on the pen input side in a manner such that the distance between the attaching boundary surface of the vibration proof material which is attached to the peripheral portion of the vibration propagating plate and the center of each of the vibration sensors lies within a range from 0.5 time to a value less than 1.0 time as large as the diameter of the sensor. Thus, the influence exerted on the vibration propagation by the attenuation of the vibration proof material can be reduced, the influence of the reflected waves which are generated from the vibration proof material attaching surface can be reduced, the detecting accuracy can be improved, and the outer size of the entire apparatus can be minimized.

WHAT IS CLAIMED IS:

1. A coordinates input apparatus in which a vibration which has been input from a vibration pen is detected by a plurality of vibration sensors attached to a vibration propagating plate and a position of the vibration pen is detected from vibration propagation times until the vibration sensors, wherein a distance between an attaching boundary surface of a vibration proof material which is attached to a peripheral portion of the vibration propagating plate and the center of each of the vibration sensors lies within a range from 0.5 time to a value less than 1.0 time as large as a diameter of the sensor.

2. An apparatus according to claim 1, wherein the distance between the attaching boundary surface of the vibration proof material which is attached to the peripheral portion of the vibration propagating plate and the center of the vibration sensor which is attached to the input side than the attaching boundary surface of the vibration proof material lies within a range from 1.0 mm to a value less than 2.0 mm.

* * * * *

UNITED STATES PATENT AND TRADEMARK OFFICE
CERTIFICATE OF CORRECTION

PATENT NO. : 5,142,106

DATED : August 25, 1992

INVENTOR(S) : YUICHIRO YOSHIMURA, ET AL.

It is certified that error appears in the above-identified patent and that said Letters Patent is hereby corrected as shown below:

Item [57] ABSTRACT:

Line 6, "until" should read --to--.

COLUMN 2

Line 46, "an" should be deleted.

COLUMN 3

Line 32, "until" should read --to--.

COLUMN 4

Line 46, "than" should read --rather than--.

COLUMN 5

Line 37, "tot he" should read --to the--.

COLUMN 10

Line 43, "WHAT IS CLAIMED IS:" should read --What is claimed is:--.
   Line 48, "until" should read --to--.

UNITED STATES PATENT AND TRADEMARK OFFICE
CERTIFICATE OF CORRECTION

PATENT NO. : 5,142,106

DATED : August 25, 1992

INVENTOR(S) : YUICHIRO YOSHIMURA, ET AL.

It is certified that error appears in the above-identified patent and that said Letters Patent is hereby corrected as shown below:

COLUMN 10

Line 62, "than" should read --rather than--.

Signed and Sealed this

Sixteenth Day of November, 1993

*Attest:*

BRUCE LEHMAN

*Attesting Officer*   *Commissioner of Patents and Trademarks*